United States Patent [19]
Tarnopolsky et al.

[11] 3,795,066
[45] Mar. 5, 1974

[54] GRAPHIC ANSWER INPUT DEVICE FOR A TEACHING MACHINE

[76] Inventors: Igor Rafailovich Tarnopolsky, ulitsa Zarodshaya 33, kv. 27.; Gennady Vasilievich Akimtsev, ulitsa Furmanova, 23, both of Frunze, U.S.S.R.

[22] Filed: Sept. 22, 1971

[21] Appl. No.: 182,658

[30] Foreign Application Priority Data
Sept. 22, 1970 U.S.S.R............................. 1472767

[52] U.S. Cl................................................. 35/48 R
[51] Int. Cl. ............................................ G09b 5/00
[58] Field of Search .......... 35/9 A, 9 C, 48 R, 48 A

[56] References Cited
UNITED STATES PATENTS
3,106,027   10/1963   Thelen ................................. 35/9 C

*Primary Examiner*—Robert W. Michell
*Assistant Examiner*—J. H. Wolfe
*Attorney, Agent, or Firm*—Holman & Stern

[57] ABSTRACT

A graphic answer input device for a teaching machine of a sandwich structure comprising four elements placed one above another, namely a board with contacts electrically connected to the logical unit of the machine, a perforated card with holes, a current-carrying plate and a problem blank for the student to plot the required drawing on, the heads of the contacts being rectilinear polyhedrons in shape, which makes it possible to have the number of holes in the perforated card equal to that of contacts on the contact-bearing board and, hence, to increase the resolution of the input device as a whole.

1 Claim, 2 Drawing Figures

PATENTED MAR 5 1974 3,795,066

3,795,066

GRAPHIC ANSWER INPUT DEVICE FOR A TEACHING MACHINE

BACKGROUND OF THE INVENTION

The invention relates to teaching machines, and more precisely, to a graphical display sensing device for teaching machines.

The present invention is directed to a device for use in teaching and controlling machines used in the course of descriptive geometry or technical draftsmanship training as well as in the course of studying other engineering subjects involving graphical solutions of problems, e.g. in the strength of materials, the theory of machines and mechanisms, in mathematics, physics, etc.

Known in the art is a graphical display sensing device for a teaching machine a U.S. patent application for which was filed on Sept. 8, 1969, (Ser. No. 885,920) comprising a contact-bearing board with a perforated card, a pressure responsive metal plate and a work sheet blank placed on top of it in succession.

The contact-bearing board is made of an insulation material with metal contacts pressed into it. The contacts are provided with square beads and are isolated from one another. Every contact can be electrically connected to the logic unit of the teaching machine with the use of conductors provided with pins at the ends. One of the pins is inserted into the socket of the contact and the other into the socket of the machine logical unit. Placed right onto the contact heads of the contact-bearing board is a sheet of standard paper with holes in it (a perforated card) every pair of holes corresponding to one of the drawing lines on the work sheet blank. The diameter of these holes determines the required accuracy of the drawing to be made by the student. Placed above the perforated card is a thin pressure metal plate connected to one of the poles of a D.C. power supply. Thus, the perforated card located between the contact heads of the contact-bearing board and the metal plate isolates them from each other when the device is inoperative. Placed above the metal plate is a problem blank which should be accurately positioned with respect to the plate. The problem blank is a sheet of standard paper with the conditions of the problem (exercise) which is to be graphically solved.

To feed the machine with the graphical answer using the device described above the student draws pencil lines on the problem blank without resorting to any additional means or performing any auxiliary operations, i.e. his actions correspond completely to the actions of the person drafting a similar drawing on a standard drawing board. Thus, the graphical answer input procedure using this device is totally natural.

The operation of the known device is as follows.

When a pencil line is being drawn on the problem blank the latter, together with the metal plate, yield to the pressure of the pencil and sag in places where there are holes in the perforated card. When sagged the holes in the perforated card the plate contacts respective heads on the contact-bearing board and, being current-carrying, it delivers an electric pulse to the heads and hence to the contacts, which, via connecting wires, transfer the pulse over to the logical unit of the machine.

In case the student has drawn the next line of the drawing correctly the logical unit of the machine gives out a signal informing the student that he may proceed with the drawing according to the programme.

The known device, however, has a number of drawbacks. The first of them is that the square shape of contact heads on the contact-bearing board does not ensure the required resolution of the device since it does not allow to draw all possible straight lines through the centres of the heads. Hence, it becomes necessary to arrange holes in the perforated card in a definite pattern (as a rule, so that the centre of the hole is coincident with that of the contact head). Thus, this arrangement not only requires that every problem should have a separate perforated card but also reduces the reliability of the contacting process itself due to the non-coaxiality between the contact head and the respective hole in the perforated card. The second drawback consists in that the replaceable perforated cards require a certain amount of time for being changed in the course of resetting the machine for operation with another programme. The third drawback relates to the technological procedure of manufacturing the contact-bearing board which is rather complicated since the contact itself has a complex geometrical configuration (the body is a cylinder with a round socket for the pin while the head is a tetrahedron).

SUMMARY OF THE INVENTION

The object of the present invention is to eliminate the above drawbacks.

The invention is aimed at increasing the resolution of the graphical answer input device with simultaneous simplification of its manufacturing procedure.

The aim is achieved by designing a graphical device made as a sandwich structure comprising four elements placed on top of one another, namely a board bearing contacts connected electrically to the logical unit of the machine; a perforated card with holes; a current-carrying plate and a problem blank, the holes in the perforated card making it possible for the current-carrying plate to touch respective contacts on the contact-bearing board, provided the next stage of the drawing procedure has been performed on said problem blank correctly, while the size of these holes determines the accuracy of the graphic answer input, in which, according to the invention, the heads of contacts of the contact-bearing board have the shape of a rectilinear polyhedron, which allows the number of holes in the perforated card to be made equal to that of the contacts on the contact-bearing board.

BRIEF DESCRIPTION OF THE DRAWINGS

The invention will be better understood from the description of an embodiment given by way of example with reference to the accompanying drawings, in which.

DETAILED DESCRIPTION OF A PREFERRED EMBODIMENT

Figures 1, 2:
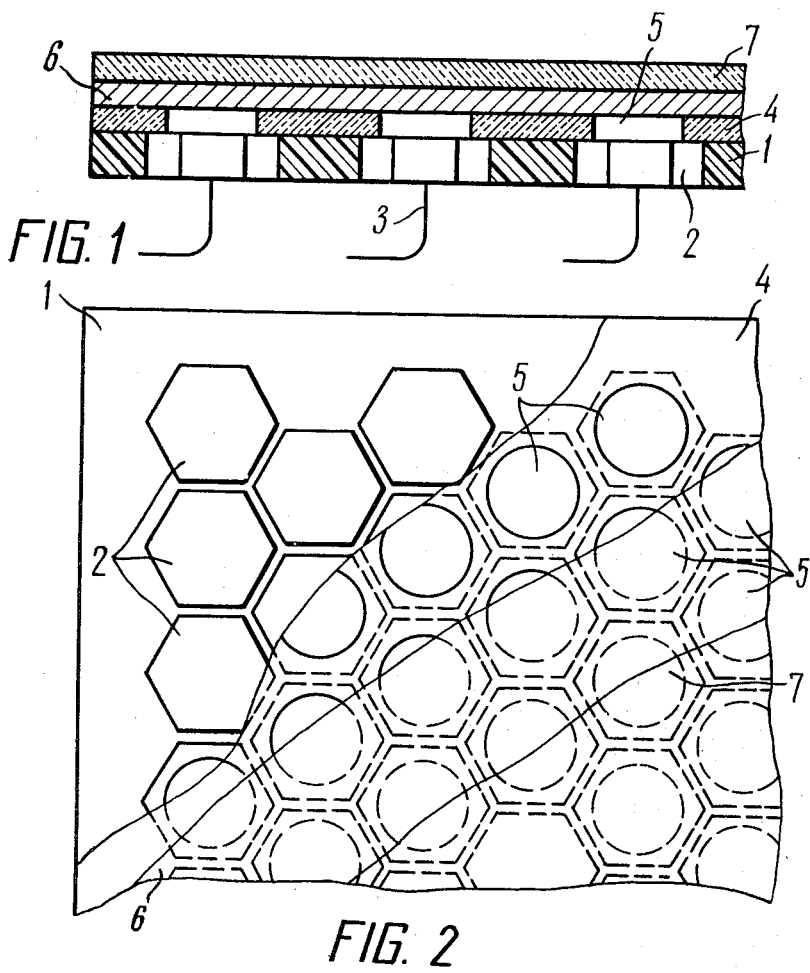
FIG. 1 shows the transverse cross section of the graphic answer input device for a teaching machine according to the invention.
FIG. 2 shows the ground plan (bottom view) of the device with partial cut-outs according to the invention.

The graphic answer input device for a teaching machine comprises a contact-bearing board 1 (FIG. 1) made of an insulation material with metal contacts pressed into it, the contacts being isolated from one another. A contact 2 is a part made a rectilinear polyhedron with a conductor 3 soldered to its bottom butt-end which connects the contact to the comparator of the logical unit of the teaching machine (not shown in the drawing).

The upper butt-ends of the contacts 2 (FIGS. 1 and 2) form a co-ordinate field of sufficiently high resolution since the operating surface of every contact has the shape of a rectilinear polyhedron. The contacts in the present device have, for instance, the shape of hexahedrons. The hexahedron shape of contacts has been selected because it makes it possible to obtain a contact-bearing board 1 with a maximum number of contacts 2 having minimum gaps between them. It is evident that the greater the number of contacts 2 on the contact-bearing board 1 the higher the resolution of the board, i.e. it allows a greater number of lines to be drawn, each one being determined by a pair of contacts. The boundaries between the contacts run along the sides of hexahedrons which increases the number of possible directions for drawing lines and, therefore, reduces the "idle area" on the co-ordinate field of the contact-bearing board.

Superimposed on the contact-bearing board 1 is a constant perforated card 4 made of a sheet of standard paper (insulator) with holes 5 whose centres are coaxial with the butt-ends of the contacts 2 on the contact-bearing board 1. The number of holes 5 in the perforated card 4 corresponds to the number of contacts 2 on the contact-bearing board 1.

The perforated card 4 is replaced only when the requirements for the accuracy of drawings to be drafted by the students are altered. To alter the accuracy requirements it is necessary to change the thickness of the sheet of the perforated card 4 itself and to modify the diameter of its holes 5. Thus, if the perforated card 4 becomes thicker while the diameter of the holes 5 becomes smaller the accuracy will be greater, and vice versa, if the card becomes thinner and the diameter becomes greater the accuracy will be lower.

Superimposed on the perforated card 4 is a pressure responsive metal plate (foil) which is connected to one of the poles of a low voltage D.C. power supply (not shown in the drawing). Placed above the foil 6 is an expendable problem blank 7.

The proposed device does not require expensive materials and is quite simple to manufacture, and at the same time it permits substantial enhancement of the efficiency of the training procedure.

The device operates in the following way.

The process of the graphic answer input in the teaching machine consists in that the student drawing the next line of his task figure on the problem blank 7 presses the current-carrying foil 6 with his pencil. The foil, yielding to the pressure in the points of the holes 5 in the perforated card 4, sags until it touches the contacts 2 on the contact board 1. If the student has drawn the line correctly the machine will emit a respective signal informing him that he may proceed with the drawing. If the line is incorrect the machine will not accept the subsequent plotting until the student gives the correct answer. And though one line drawn on the problem blank makes the foil 6 touch many contacts 2 of the board 1 located along this line, conductors 3 will feed the logical unit of the machine with only two electric pulses from two quite definite contacts 2 of the board 1 which at the given stage of the procedure determine unambiguously the line that should be drawn by the student.

The sequence of operation of contact pairs is preset by the logical unit of the machine in the form of a programme which is omitted from the present description.

The proposed design makes it possible to feed the teaching machine with graphic displays in the natural way and to enhance considerably the efficiency of the training process and that of the students' apptitude control. It allows to increase the number of various graphic problems to be solved due to the high resolution of the contacts on the board 1 and to the reduction of the so-called "idle area." Besides, it shortens the time required for readjusting the machine to operate with a different programme.

To introduce another programme in the machine the present device does not require that the perforated card should be replaced; thus, it becomes possible to automate the whole of the process of readjusting the machine for operation with another programme.

The above advantages of the present device testify to the fact that it is highly efficient and can be widely used for training in graphics.

What we claim is

1. A graphical display sensing device, for use in an electric instructional machine, having first, second, third and fourth members disposed one above the other to form a sandwich; said first member comprising a co-ordinate contact-bearing board with metal contact means affixed thereto, said contact means having contact heads of hexahedral shape which are disposed in a geometric order and insulated from each other, whereby the hexahedral shape of the contact heads improves the resolution and accuracy of the device; said second member comprising a perforated card having holes, the number of which is equal to the number of said contact heads in said first member, the holes being disposed in alignment with said heads, said third member comprising a current-carrying plate means; and said fourth member being a worksheet blank, said current-carrying plate means being yieldingly responsive to pressure applied to the worksheet blank so that electrical contact is made, through said holes in said second member, between said third member and said contact heads of said first member.

* * * * *